United States Patent

Greengard, Jr. et al.

[15] 3,653,595

[45] Apr. 4, 1972

[54] AUTOMATIC TURF WATERING SYSTEMS

[72] Inventors: Julius Edward Greengard, Jr.; Thomas J. Scannell, both of c/o Cyclomation Systems, Inc. 235 Bay Road, Voorheesville, N.Y. 12801

[22] Filed: Dec. 7, 1970

[21] Appl. No.: 95,738

[52] U.S. Cl. ..................................................239/70
[51] Int. Cl. .......................................A01g 27/00
[58] Field of Search................................239/70; 137/624.11

[56] References Cited

UNITED STATES PATENTS

| | | | |
|---|---|---|---|
| 3,379,894 | 4/1968 | Carsten.................................. | 239/70 |
| 3,463,396 | 8/1969 | Borel..................................... | 239/70 |
| 3,524,471 | 8/1970 | Bresser.................................. | 239/70 X |
| 3,580,504 | 5/1971 | Benham................................. | 239/70 |

Primary Examiner—Lloyd L. King
Attorney—Buell, Blenko & Ziesenheim

[57] ABSTRACT

A turf watering control system is provided for automatically watering selected areas of turf according to a preselected plan, which system includes a master control station and a plurality of spaced slave stations each connected to the master station by a power line, a source of operating electric power applied to said master control station, a plurality of sprinkler valves spaced from each slave station, connections between said valves and each said slave station whereby said valves are selectively opened and closed, an encoder source of radio frequency in said master control station applied to said power lines, decoder means at each of said slave stations, means at said slave stations actuated by said decoder means to energize the connections to said sprinkler valves and means at the master station selectively energizing the encoder means whereby a selected signal is transmitted to selected decoder means through said power lines.

10 Claims, 14 Drawing Figures

Fig. 8.
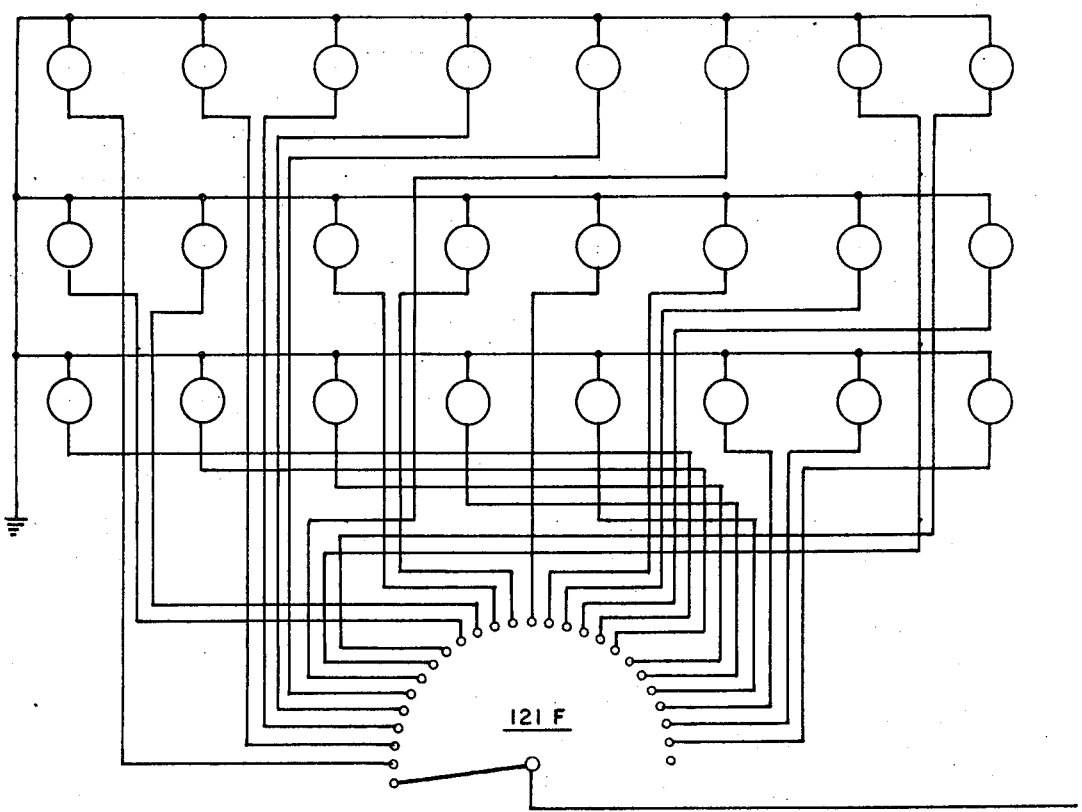
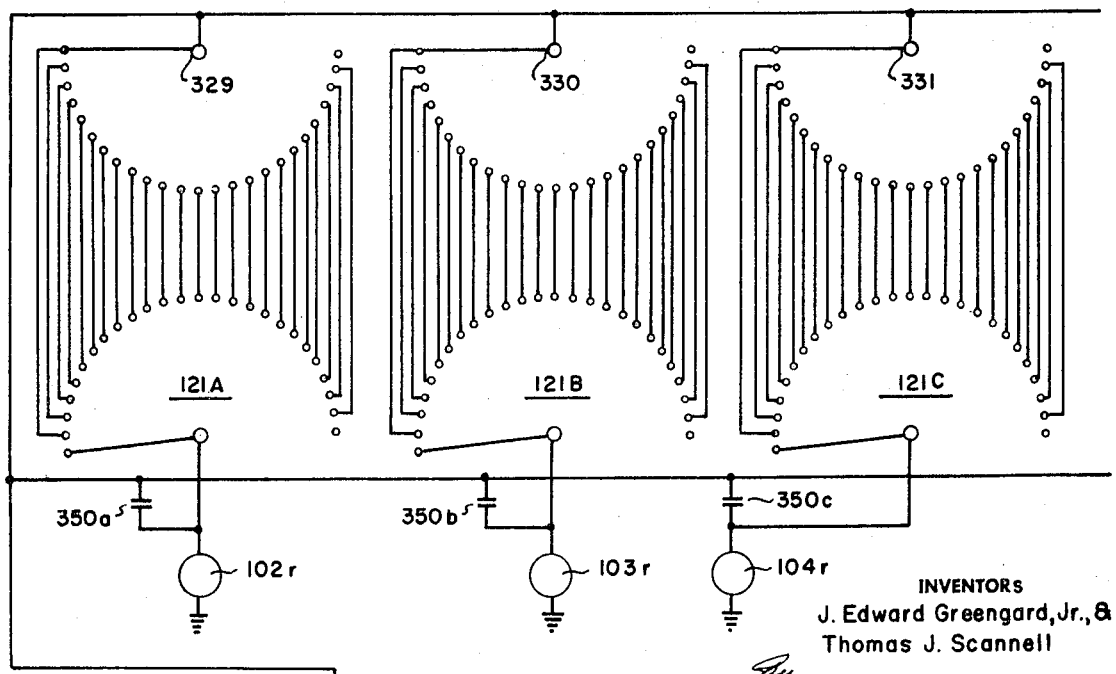

INVENTORS
J. Edward Greengard, Jr., &
Thomas J. Scannell

Fig. 12.
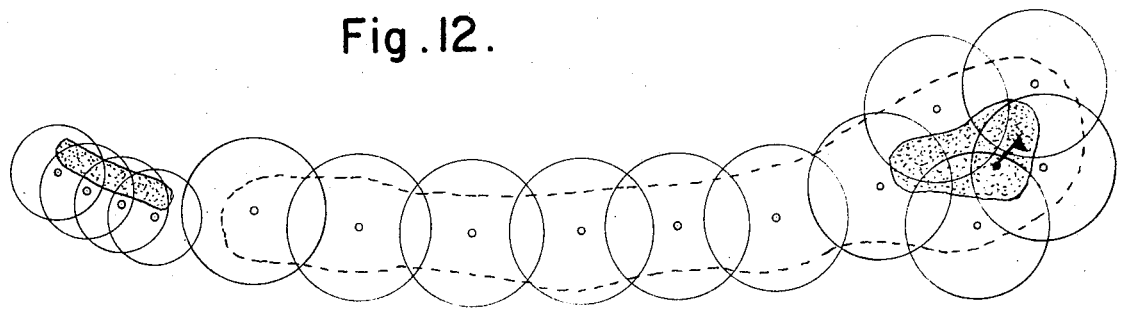
Fig. 13.
| | | Fig. 8. | Fig. 9. |
|---|---|---|---|
| Fig. 4. | Fig. 5. | Fig. 6. | Fig. 7. |
| | Fig. 1. | Fig. 2. | Fig. 3. |
Fig. 14.
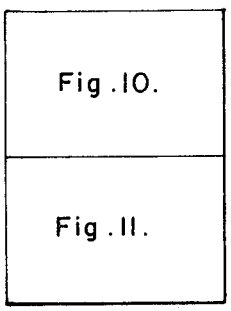
INVENTORS
J. Edward Greengard, Jr., &
Thomas J. Scannell

AUTOMATIC TURF WATERING SYSTEMS

This invention relates to automatic turf watering systems and particularly to a turf watering system with centralized automatic control of the watering function.

There are many turf covered areas such as golf courses where the problem of adequate watering is of great importance. In the past, manual or automatic control of watering has been the general practice where large areas of turf are to be watered. Such manual and automatic systems took various forms as for example systems having individual controllers for each sprinkler or satellite station having a plurality of sprinklers controlled from a single station. Manual control of such systems is expensive and if short initial repeat cycle watering is desired, manual control is virtually impossible because of the large number of valves to be operated. The automatic systems which have been available are based upon controllers each operating a series of points in sequence. In such systems a power line is run from each controller to a power source and a group of sprinkler valves are connected to each controller. Such systems lack flexibility and cannot provide the necessary control to meet changing conditions over the area involved with much manual effort and time in visiting all controllers and changing them to suit the new conditions. Fully centralized automatic systems have not been practical because of the inordinate amount of wiring necessary to wire every sprinkler valve to a central location.

The present invention provides the fully automatic control of sprinkling systems for large areas without any of the problems outlined above. In the present system control of all sprinklers from a central location is maintained with less buried wire than in the semiautomatic systems where the controllers are located at spaced points over the area to be covered. In the present invention the area to be watered is divided into a plurality of zones and slave units are placed in each zone and individual sprinklers are operated on a short cyclic basis so that any sprinkler can be operated through a selected number of short cycles rather than a long cycle. This permits very exact control of watering at any selected area and gives a degree of flexibility not available in any existing system. Our form of centrallized control incorporates the many novel features which will be described in connection with a golf course. These features include:

1. The area to be watered is divided into a number of zones. Normally the controller is designed with provision for ten zones, but this is not limited. In actual practice an 18 hole golf course may be divided into six or seven zones. Initial turn on of water is sequential starting with zone one and adding additional zones approximately every five seconds. After completion of the preset watering time on the operating sprinklers, transfer to the next sprinklers is again sequential and after completion of the watering program turn off is sequential with zone one shutting down first followed by the other zones, one approximately every 5 seconds. This technique prevents hydraulic shock and possible cavitation of the pump since only small changes in the hydraulic load are made at any one time. If all sprinklers to be operated simultaneously, which would normally utilize the full capacity of the pump, are energized at one time the sudden pressure drop may well cause cavitation in the pump. Conversely, if all such sprinklers are turned off simultaneously the hydraulic shock presented may well cause damage to the piping.

2. Other systems use a conventional 24 hour clock for starting time equipped with a 14 day tripper dial. This permits repetitive programming on a limited basis; that is, every day, every 2 days, every 7 days, or every 14 days. This presents a major disadvantage. For example it may be desirable to set up a watering program whereby greens are watered 1 night, tee's the next night and the fairways divided over the next 2 nights and then to repeat this program regularly or to provide a day or 2 with no watering and then repeat, thus requiring an overall 4, 5 or 6 day program. We have therefore provided for up to 10 days and then repeat. There is however no limit to the system and any number of days could be provided before repeat merely by incorporating additional switches and more points on the stepping switch.

3. We provide for four independent automatic watering programs. Normally one program would be for tee's, one for greens and two to cover all the fairways. However these programs are completely flexible and any or all sprinklers may be incorporated in any or all programs. This would permit incorporating an area which required more water than others into two programs instead of the normal one. The system is not restricted to four programs but could be made with more or less merely by incorporating more or fewer switches, selector switches and banks on the stepping switches.

4. Any or all of the automatic programs may be operated on any or all of the days in which the system is inoperation.

5. An independent manual program is also provided. This permits the operation of any desired sprinklers on any desired time cycle without interrupting the normal automatic programs. For example, this might be used to water in fertilizer in a particular area.

6. A separate program is provided for dew wash. It is undesirable to either mow grass or use the turf for playing golf when dew is present. Dew also tends to encourage fungus growth and other diseases. Dew can be removed satisfactorily however by short time sprinkling. We therefore make provision for operation of all sprinklers in sequence for an interval determined by a separate timer. This timer would normally be set to provide for one revolution of the sprinkler before transferring to the next sprinkler to be operated. The dew wash is independent of all other programs and is normally started with a push button. However an additional clock can be provided to start the dew wash automatically if desired.

7. Greens syringing is another desirable feature. Some grasses such as poa annua cannot survive a long spell of hot dry weather. Poa annua for example dies when the temperature of the grass reaches 90°. Under such conditions it is normal to water the greens in the late afternoon not for irrigation purposes but in order to cool the grass. Since this is done during normal playing hours our system operates in the following sequence. When the greens syringe program is actuated an alarm signal is transmitted to all remote units which can be used to actuate a horn, bell or other device. This notifies players on the greens that syringing is about to take place and that they should mark their balls and leave the greens. At a pre-determined time, normally 30 seconds, after this signal is transmitted the greens sprinklers are energized in sequence for a short interval normally the same as is used for dew wash, thus in a matter of a few minutes all greens are syringed. It is obvious that if this is to be done manually the grounds crew must go from green to green, either waiting for people to play off the green or advising them to leave, then operating the sprinklers. This utilizes substantial man hours of labor.

8. Pause Timer: Normal operation of a program will energize in sequence the various sprinklers selected for the program desired and repeat this program as many times as preselected and then shut down. A pause timer is provided which may be inserted in the manual program. This introduces an adjustable delay between repeat cycles. This has particular merit when dealing with newly seeded areas. These areas must be kept moist in order to cause germination of the seed. A manual program can be set up which will provide a short watering cycle, perhaps 1 revolution of the sprinklers, in the area which has been seeded and then introduce a pause of perhaps 30 minutes to 1 hour and repeat this light sprinkling cycle. By setting a sufficient number of repeat cycles this program will operate automatically all day if desired thus maintaining the surface in a moist condition without overwatering.

9. Dual Day Operation: A switch has been provided which, if operated, causes the daily programmer upon completion of the automatic cycle called for to advance 1 day and again operate the automatic programs called for on this day also and then shut down. It is true that without the use of this switch the programs called for on the second day could have been added to the first day and accomplished this total watering cycle. However the programs would then be operating intermixed where as with the dual day operation they are operated consecutively. Since the typical installation does not have any great excess of watering capacity, normally the daily program will occupy all the available hours for watering. However if, because of some rainfall it is possible to shorten the total time required, it may be practical to accomplish watering of a greater area in the 1 night. There may be some areas, however, which cannot be watered early such as greens or tee's adjacent to the club house, which cannot be watered when people may be present in the club house area. The dual day operation can be used, therefore, so that other areas are watered first and then these areas are watered after completion of the first operation. Many clubs are always closed 1 day a week. It is therefore possible to initiate a start of a watering cycle earlier than usual on this day and utilize the extra time available to run a second program following the first. One other advantage of utilizing the dual day operation is that it does not require any change in normal programming and hence requires no restoration of the programs to resume normal operation.

10. A test position is also provided for which permits complete checking of the functioning of a remote unit in approximately 2 minutes.

11. The system has almost unlimited capacity. One central controller can be used to control a multiplicity of golf courses merely by the use of sufficient remote units.

12. By the addition of more starting clocks and a group of selector switches the system can be modified to permit different starting times for different programs where this is advantageous.

Preferably there is provided a master control station and a plurality of spaced slave stations each connected to the master station by a power line, a source of operating electric power applied to said power line, a plurality of sprinkler valves spaced from each slave station, connections between said valves and each said slave station whereby said valves are selectively opened and closed, a source of AM, FM, or audio frequency current applied to said power lines or separate control lines, encoder means at said master control station, decoder means at each of said slave stations, means at said slave stations actuated by said decoder means to energize the connections to said sprinkler valves and means at the master station selectively energizing the encoder means whereby a selected signal is transmitted to selected decoder means. Preferably the power line is provided with 230 volt, 60 Hz. power from the master station to the slave stations with the control tones modulating radio frequency applied to the same lines or to control. The modulated radio frequency can be either AM or FM. It is of course obvious that the power supply could be 115 volt or any other desired voltage. It is also obvious that the audio tones or radio frequency could be applied directly to the power line using high pass filters to isolate the encoding and decoding equipment.

In the foregoing general description certain objects, purposes and advantages of the invention have been set out. Other objects, purposes and advantages of this invention will be apparent from a consideration of the following description and the accompanying drawings in which:

FIGS. 1–9 are a schematic wiring diagram of the master control circuit;

FIG. 12 is a plan view of a tee, fairway and green of a single golf hole showing an arrangement of sprinklers typical of those used in the invention;

FIG. 13 is a layout of FIGS. 1–9 forming the master control circuit; and

FIG. 14 is a layout of FIGS. 10 and 11 forming the slave control circuit.

Figure 1:
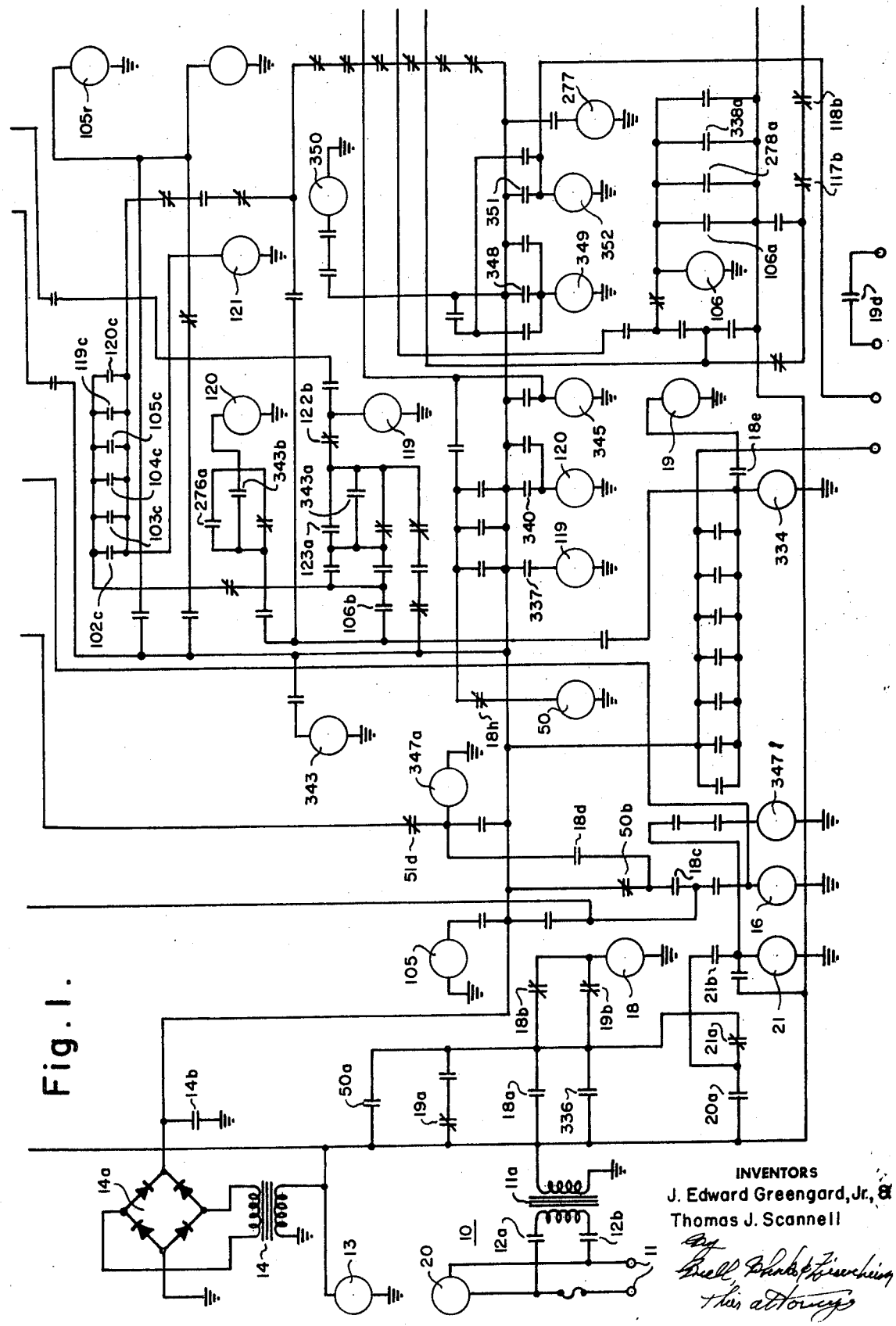
Figure 2:
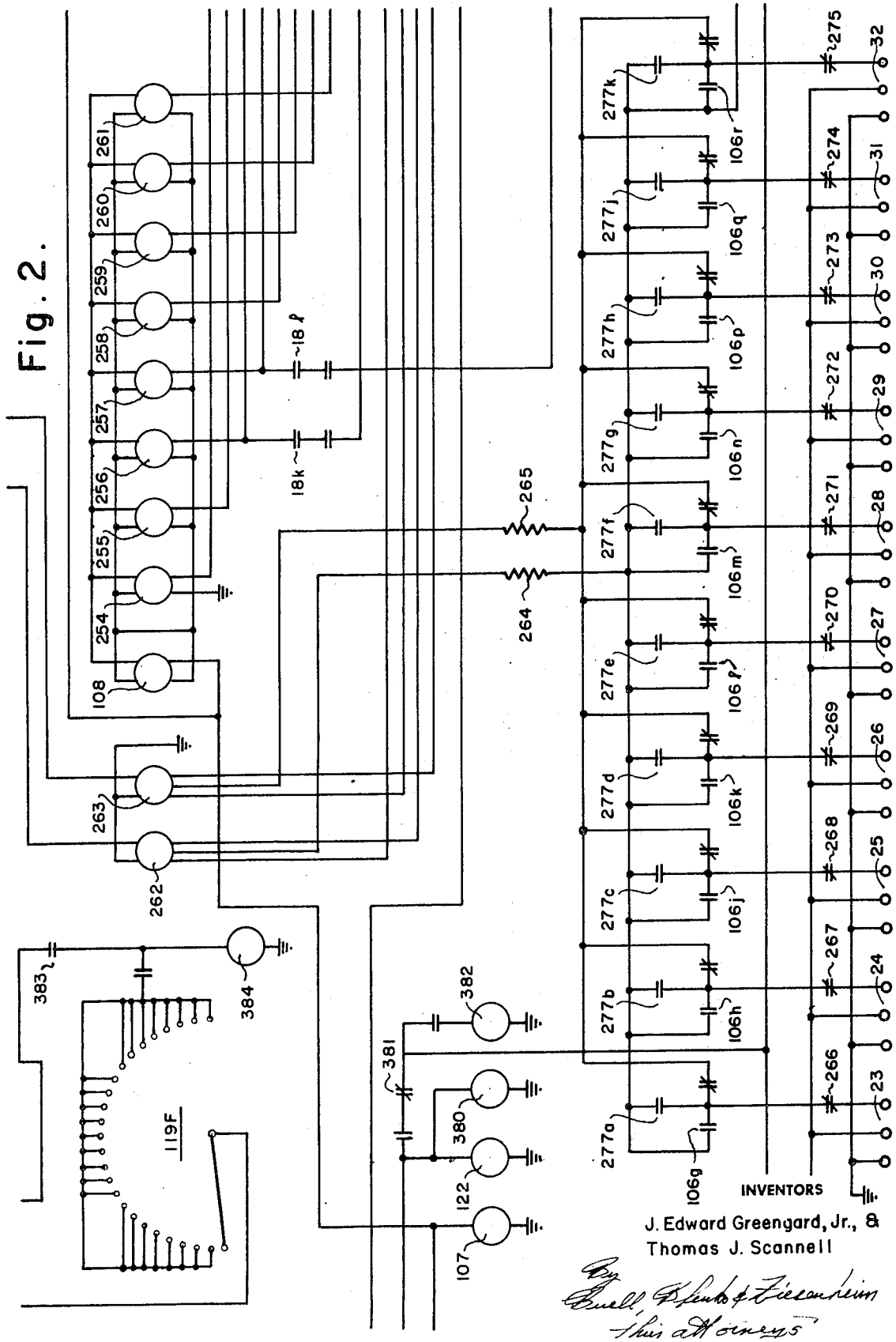
Figure 3:
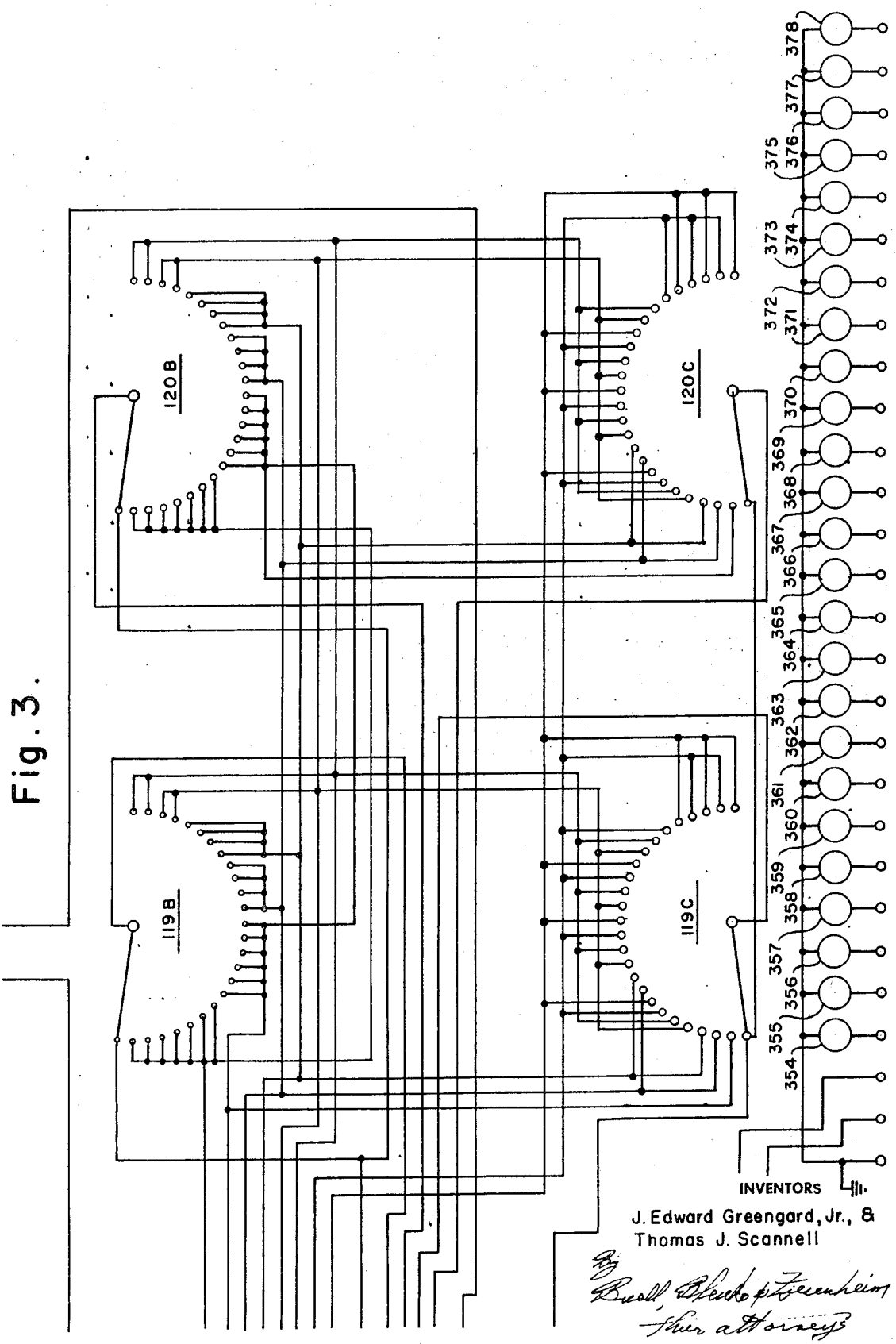
Figure 4:
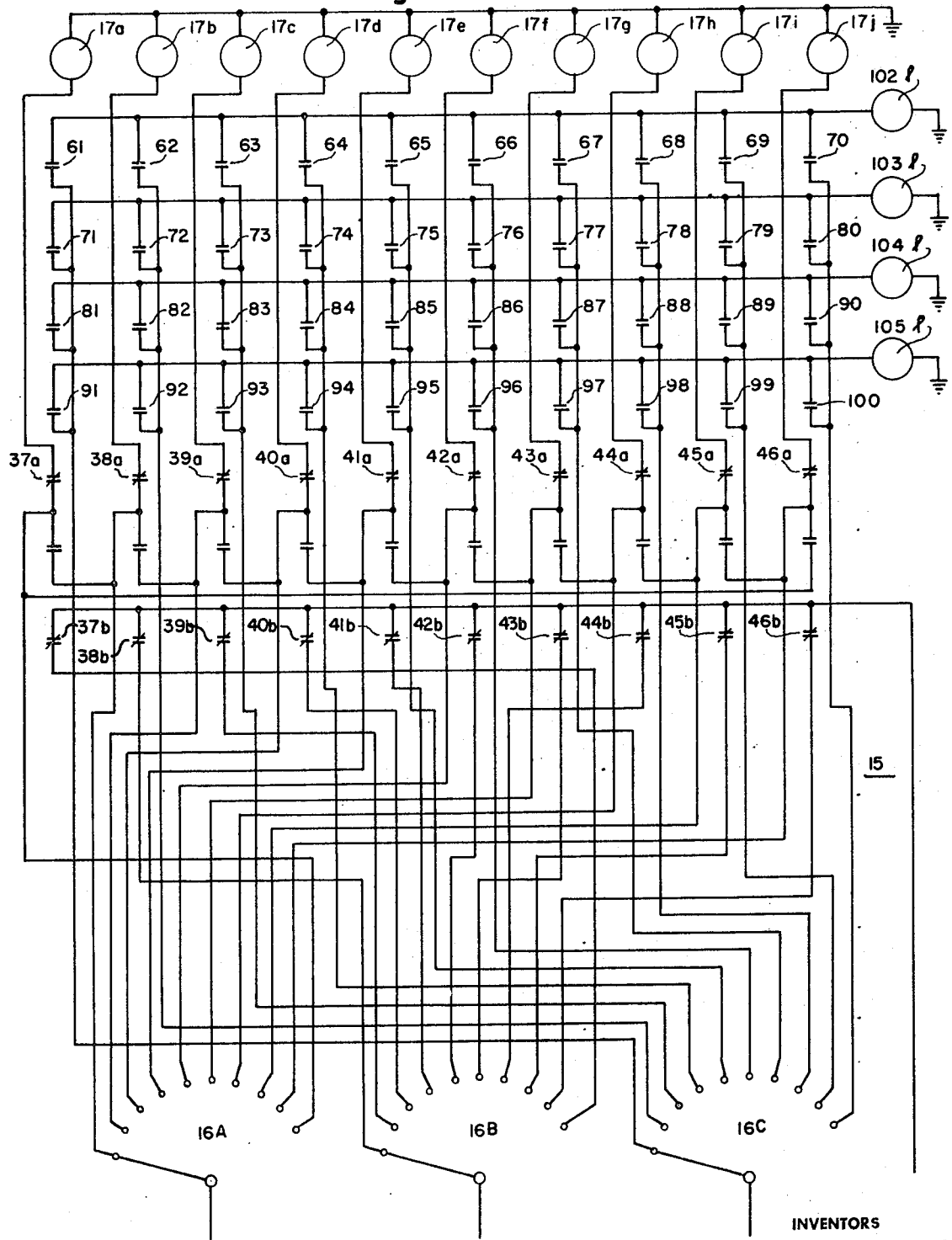
Figure 5:
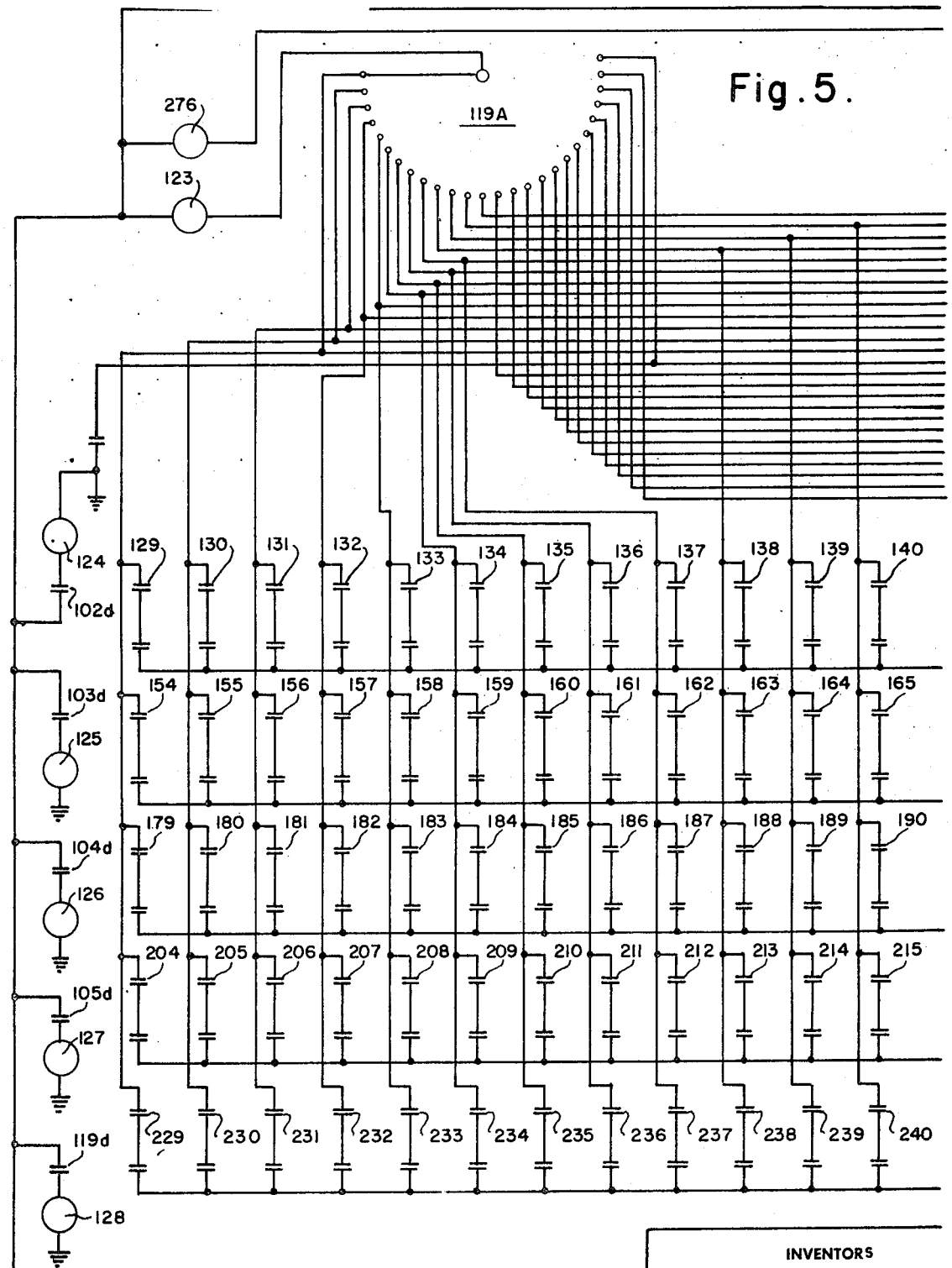
Figure 6:
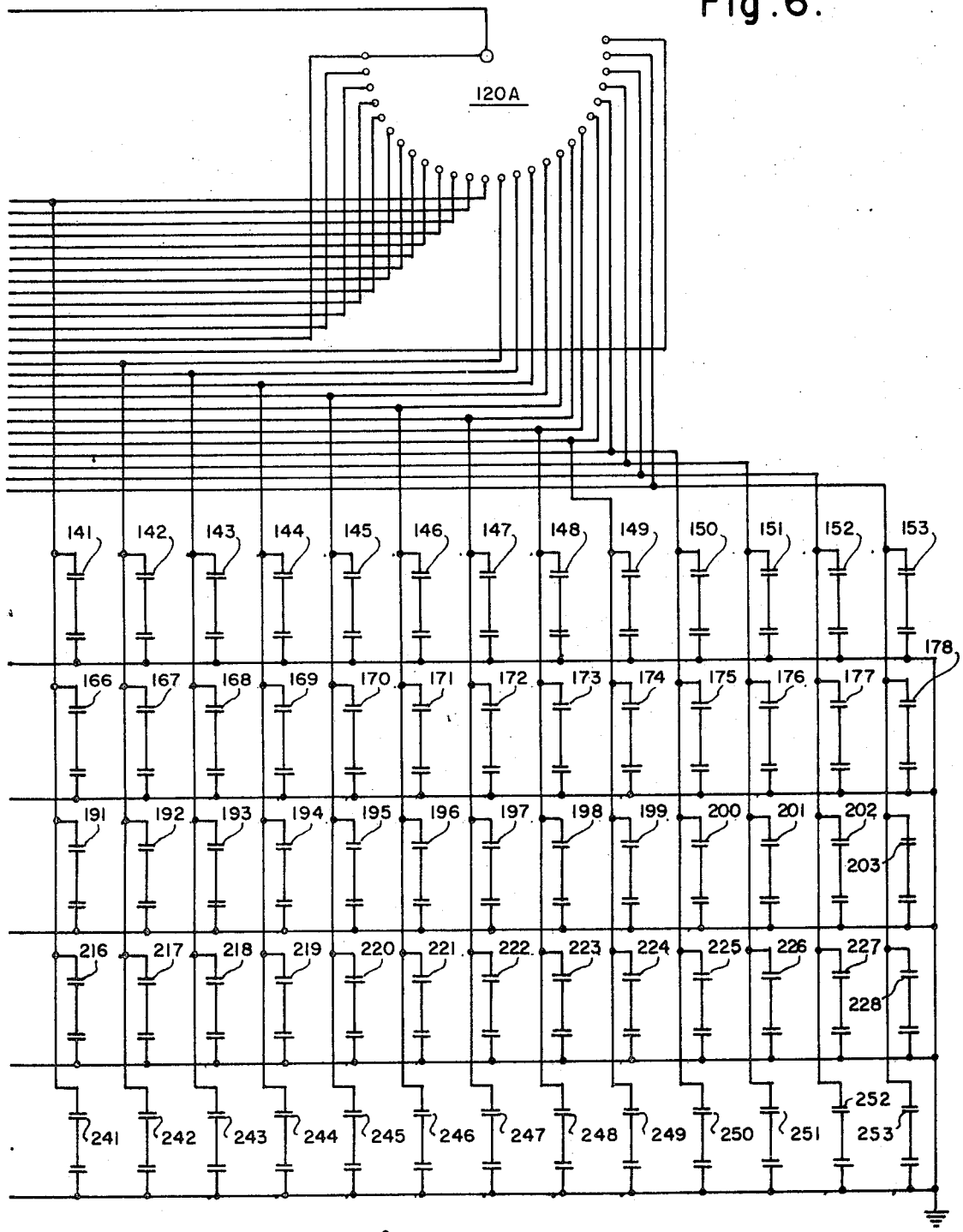
Figure 7:
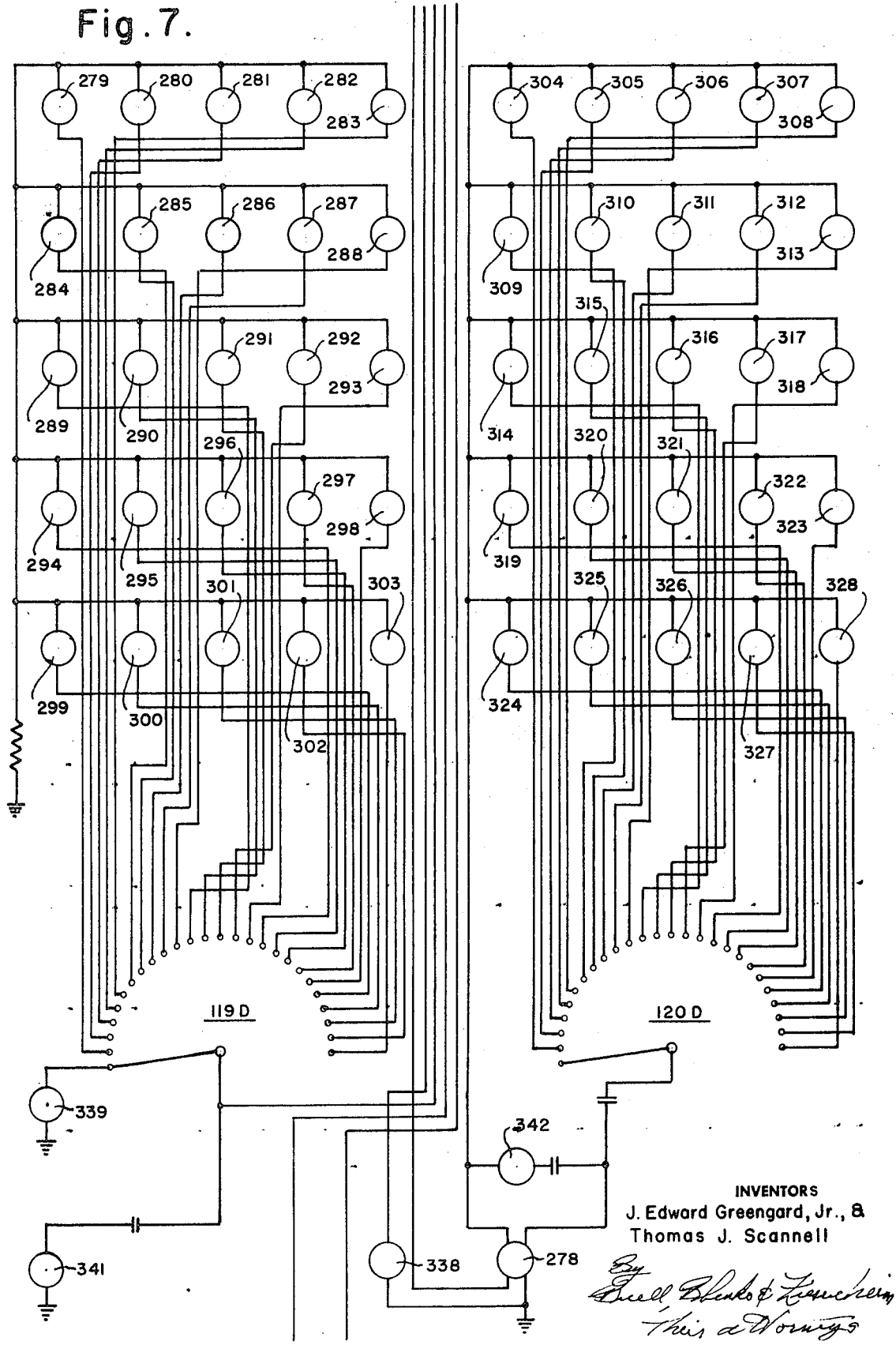
Figure 9:
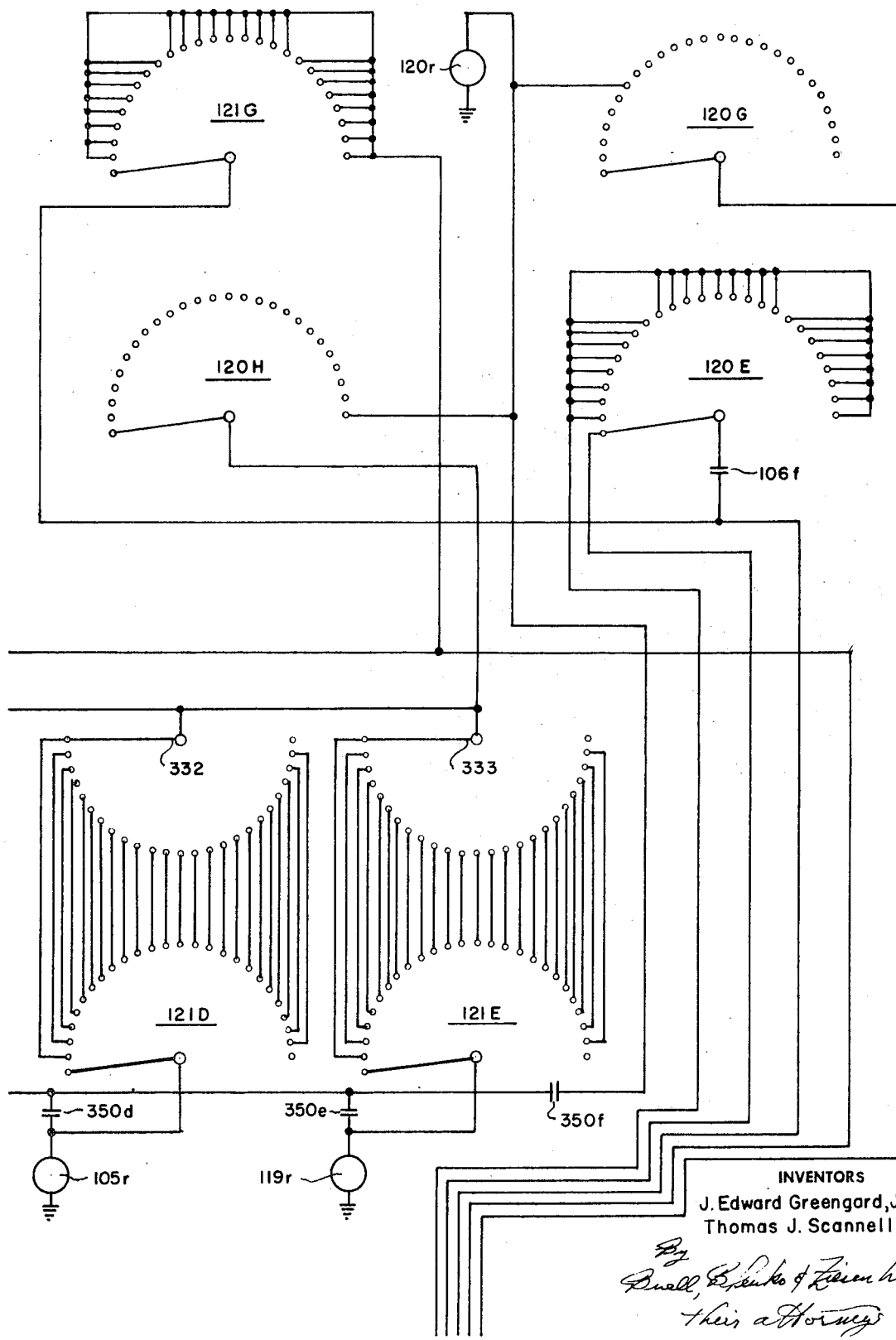
Figure 10:
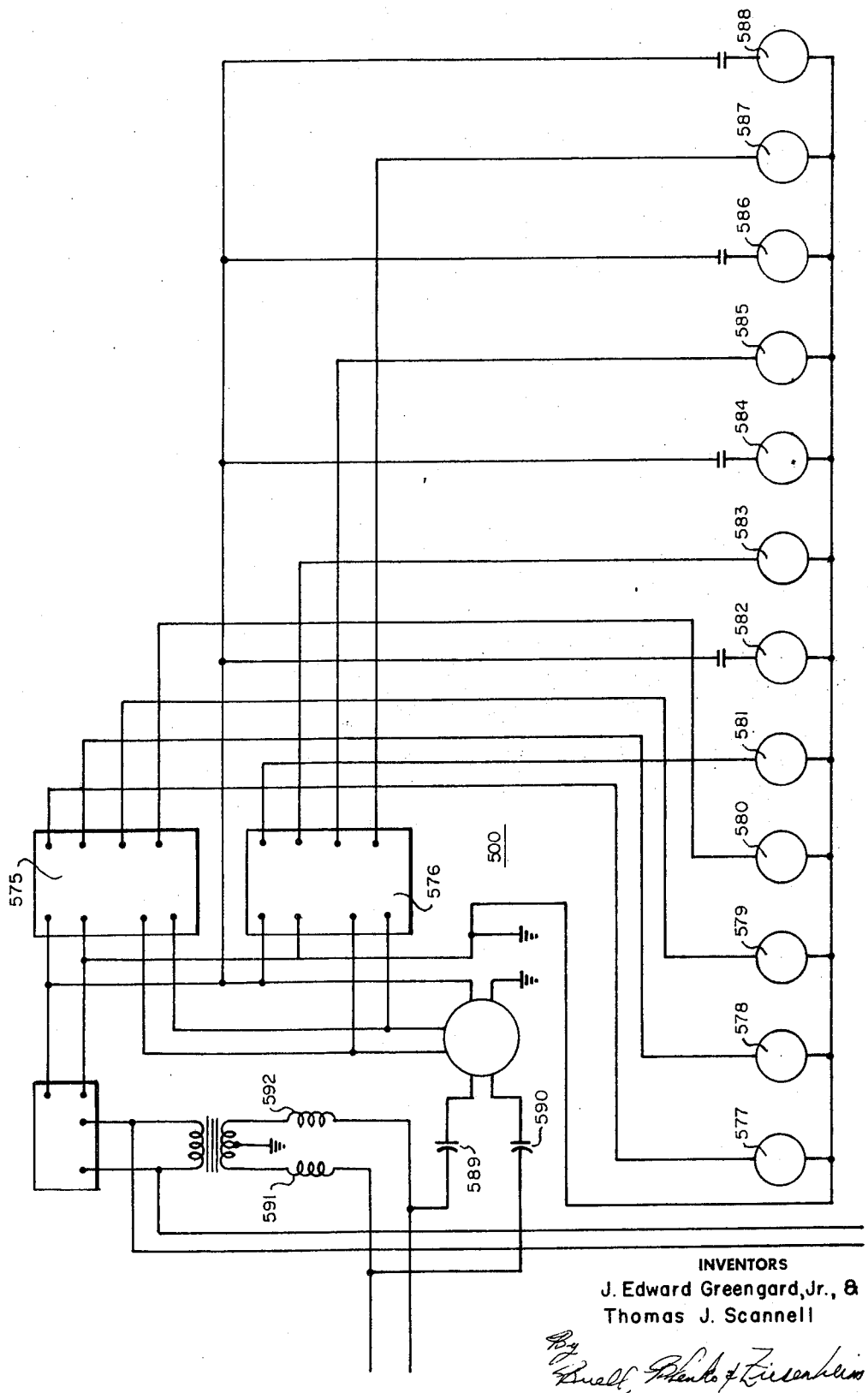
FIGS. 10 and 11 are a schematic wiring diagram of a slave control circuit.
Figure 11:
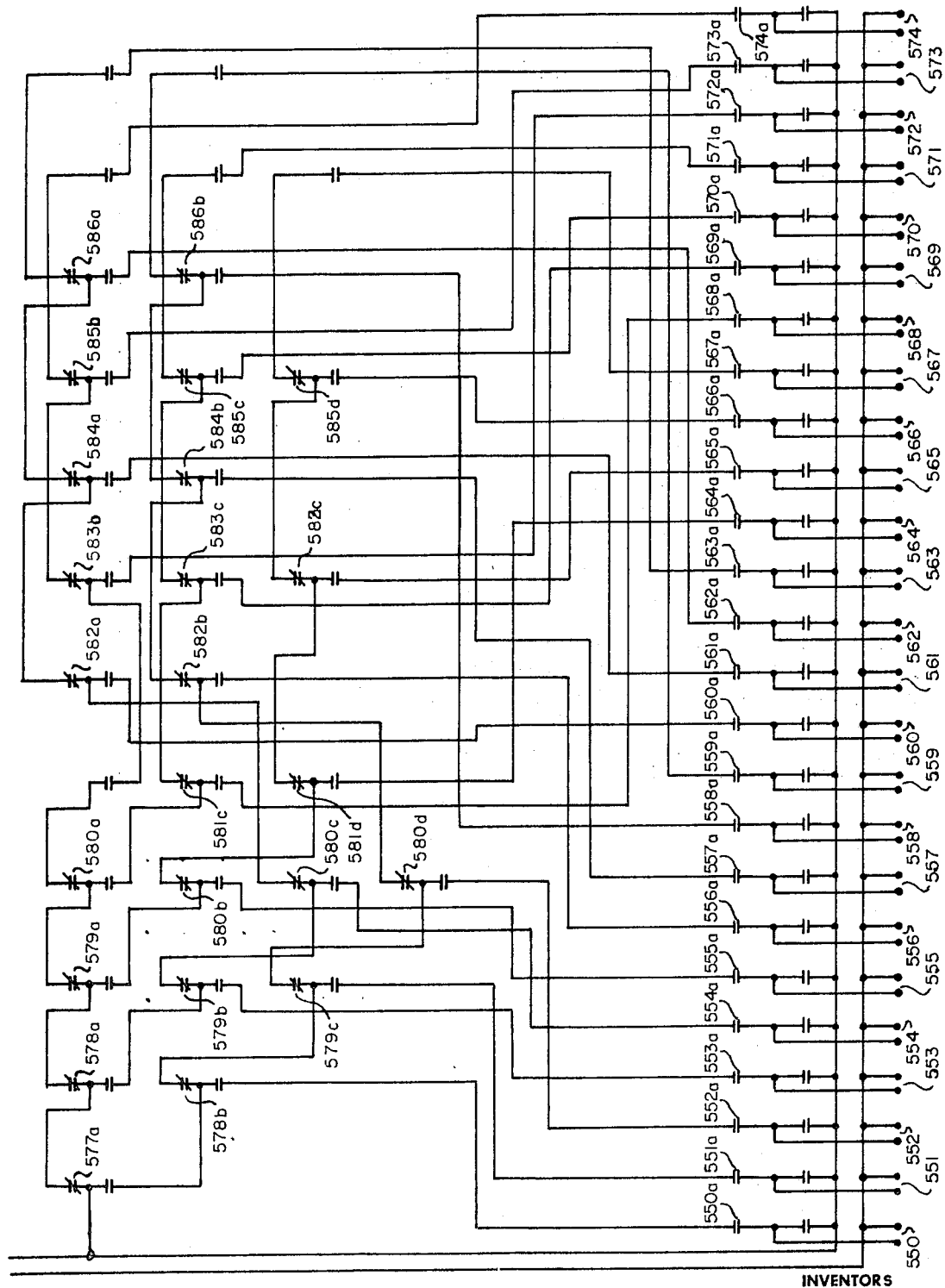

Referring to the drawings, there is illustrated a master control 10 having power input connections 11 receiving 115 volt 60 cycle input current through input switches 12a and 12b which energizes pilot light 13, the input coils of a 24 volt DC power supply transformer 14 and through bank 15 of stepping switch 16, one of the daily indicator lamps 17a to 17j and through normally closed relay 18a and switch 18b to sequencing timer 18. A parallel circuit connects the power input connection 11 with a motor of starting clock 20 so that power is always on in the starting clock 20. The sequencing timer 18 stops itself at the end of one revolution by opening cam switch 21. The 115 volt power supply for all equipment except the motor of the starting clock comes from isolation transformed 11a whose secondary provides 115 volt power with one side grounded. Pilot light 11b indicates the system is in operation. The several zones are connected by two output lines each 23 through 32 inclusive. Each of the zone outputs has been provided with a high pass filtering system to prevent the 115 volt 60 cycle current from interfering with the proper operation of the encoding and decoding amplifier.

A manual access switch 22a and 22b, when operated, will energize the 115 volt supply to the zone lines 23 through 32 inclusive to permit manual operation of the sprinklers from the slave circuits 100.

When the contacts 20a of the starting clock 20 are closed, power is supplied to time delay relays 33 through 36 inclusive. Relay 33 closes its switch 33a in 2 seconds after the relay is energized and applies 24 volt current to the coil of stepping switch 16. Relay 36 opens its switch 36a in 3 seconds removing the 24 volts from the coil of stepping switch 16 which advances one step. A series of skip-a-day switches 37 through 46 are provided in association with stepping switch 16 so that if any one of switches 37 through 46 is operated, the stepping switch 16 will self pulse to the next day programmed. Indicator lights 17a through 17j indicate the next automatic program to be run so that while a particular program is being operated, the indicator lights will show the program to be operated for the following night.

When the starting clock 20 reaches the time set for initiation of automatic programming contacts 20a close. The duration of this closure is not critical but it must be at least 30 seconds and must be less than the time required to operate the shortest cycle. It will therefore be adjusted to be on for a period of from 5 to 10 minutes. Closure of 20a connects power through normally closed contacts 18a through normally closed contacts 18b in parallel with normally closed contacts 19b to the motor of sequence timer 18. The timer 18 operates 11 cams and takes 2 minutes for 1 full revolution in the embodiment here illustrated. All cam positions are described with relation to the position of the first cam 21. Cam 21 maintains its contacts closed except from the starting position to 3° after start. Therefore approximately one second after start contacts of cam switch 18a close bridging the normally open contacts 20a of the starting clock 20 and the normally closed contacts 21a, cam 21c closes from approximately 4° to 6 ° applying DC power to stepping switch 16 through one pair of interrupter springs on 16. One terminal of normally closed section B of the ten omit day switches 37 through 46 is connected to one side of the interrupter springs. The other terminal of these switches are connected to the terminals of bank B of stepping switch 16. The wiper of bank B is connected to the other terminal of the interrupter spring. Therefore if all these switches are in the normally closed position the stepping switch 16 will step one step when power is applied through sequence timer cam 21c and normally closed contacts 50b since the interrupter springs will be bridged by the normally closed switch connected to the stepper bank in that position. If however the switch connected to bank B at the point contacted by the wiper arm should be open then the interrupter springs will operate to step the stepping switch an additional step. If more than one consecutive switch is open the stepper will continue to step until it reaches a closed switch. Therefore the number of days in the program can be varied from 10 with all switches closed to one with only one switch closed. It should be noted that the next program indicator lights 17a through 17j are connected to the power source through bank A of stepping switch 16 and section A of omit day switches 37 through 46. These are so connected that the light which is energized is at the next stopping position of stepping switch 16. If all 10 days are to be used it will always be the next light after the present wiper position, but if omit day switches are operated it will be the light at the next position at which the wiper will stop. Cam 18d of sequence timer 18 closes from 8° to 10°. It applies DC power through normally closed contacts 51d to the wiper of bank C of stepping switch 16. The bank terminals of 16c are connected to one side of daily program switches 61 through 100. The other side of 61 through 70 are connected to latch coil of relay 102. Similarly 71 through 80 are connected to 103, 81 through 90 to 104 and 91 through 100 to 105. When 18d operates therefore it will latch relays 102 through 105 provided the associated switches for that days program are operated. The position of switches 61 through 70 will therefore determine what programs, if any, will be operated on that day. Cam 18e closes from 12° to 14° and if any of the group relays 102 through 105 are operated it will apply power to relay 19 latch coil. Cam 18g closes from 282° to 284°. This applies power through 19a normally open and 105c normally closed contacts to the motor of sequence timer 106 whose operation will be described subsequently. Cam 18v opens from 290° to 292°. This stops sequence timer 18 at 290° of revolution. The balance of the operation of sequence timer 18 and the action of the other cams which it operates will be described subsequently.

When 19 is energized by sequence timer cam 18e, relay 19a closes applying AC power to system operation pilot 107 and to the power supply 108 for tone generators 109 through 116. It also applies power through zone power switch 22a in the automatic position and through normally closed contacts of 117b and 118b to the zone lines. Relay 19b contacts open removing the bridge across sequence timer cam 18b permitting sequence timer 18 to stop when cam 18b opens. Contacts 19d close providing the remote pump start circuit. Closure of cam 18g of sequence timer 18 applies power through normally closed contacts 117c through the motor of sequence timer 106. Cam 106a which is closed except from 0° to 4° maintains operation of sequence timer 106 for the balance of 1 revolution. This sequence timer makes 1 revolution in 1 minute. Cam 106b is closed from approximately 6° to 26°. It applies DC power through normally closed off normal springs of stepping switch 119 through normally open contacts 102c in parallel with similar contacts 103c–105c, 119and 120c on relay 103 through 105, 119 and 120 at transferring least one set of which will be closed, to the coil of stepping switch 121 which is the cycle count stepper. Normally closed interrupter springs A on stepping switch 121 close, bridging the normally open off normal springs of stepping switch 119 and applying power through normally closed interrupter springs of 119 and through normally closed contacts 122b to stepping switch 119. The armature of stepping switch 119 pulls in opening normally closed interrupter springs releasing the armature and causing switch 119 to step. This opens it normally closed off normal spring releasing the holding current on the magnet of stepping switch 121 and causing switch 121 to step to the first step. At the same time the normally open off normal springs of stepping switch 119 close bridging the interrupter springs of stepping switch 121 which are now open. Stepping switch 119 will self pulse and continue to step until its normally closed interrupter springs are bridged by the closure of contacts 123a. This will hold the stepping switch armature in the energized position until sequence timer cam 106b opens removing power from the stepping switch circuit, whereupon the stepping switch 119 magnet will release and the switch will move to the next step. As previously described one or more of the latching relays 102 through 105 will have been operated depending on which automatic programming group is called for. This will have closed one or more sets of contacts 102 d through 105d and operated one or more of the sunflower relays 124 through 128. If relay 124 is operated it will apply a ground to one terminal of program switches 129 through 153. Similarly relay 125 would ground switches 154 through 178, relay 126 will ground switches 179 through 203 and switch 127 will ground switches 204 through 228. The other terminals of these switches are connected to bank A of stepping switch 119 and bank A of stepping switch 120. The wiper of bank A of stepping switch 119 is connected to one side of the coil of relay 107. The other side of the coil is connected to the DC power supply through relay 19c. When the wiper of stepping switch 119 bank A reaches a ground point 107 will operate, stopping the self pulsing of stepping switch 119. When power is removed from the self stepping circuit by the opening of sequence timer cam 106b the stepper will advance to the next step and remain there. Therefore the programming switches 129 through 253 are connected to bank A of stepping switches 119 and 120 one step earlier than their desired stopping position. That is, switch 129 is connected to the homer position of the switch, switch 130 to the first point etc. The stepping switch has now stopped in a position corresponding to the first sprinkler to be operated. The output of the eight tone generators 254 through 261 is connected to banks B and C of stepping switches 119 and 120 in such a manner as to provide a different pair of tones for each position of the stepping switches, switches 119 and 120 are wired alike so that the same pair of tones is received on corresponding positions of both switches. The wiper arms of stepping switch banks 119B and 119C are connected to the two inputs of amplifier 262 which has a common output. In a similar manner banks 120B and 120C are connected to the inputs of amplifier 263 which has a common output. The output of amplifier 262 is connected through limiting resistor 264 to the normally open connection of sequence timer cams 106g through 106r. Similarly the output of amplifier 263 is connected through limiting resistor 265 to the normally closed contacts of these sequence timer cams. The common connection of these cams is connected through zone isolation switches 266 through 275 to the control lines of zones A and through K. Sequence timer cam 106g closes from approximately 30° to 322° applying tones to zone A and turning on the first sprinklers it is intended to operate. Sequence timer cam 106h closes from approximately 60° to 322° applying tones to zone B and causing the first sprinklers to operate in that zone. Each of the cams 106h through 106r closes in sequence approximately every 30° thus causing sequential turn on of all zones. Cam 106c operates at approximately 304° to 318°. This energizes the circuit to stepping switch 120 whose interrupter springs are paralleled by contacts 176A. Relay 276 is in the wiper circuit of bank A of stepping switch 120. Stepping switch 120 will therefore step to the same position already maintained by stepping switch 119 and apply the same pair of audio tones to the normally closed contacts of sequence timer cams 106g through 106r. Sequence timer cam 106e closes from 308° to 346° this operates sunflower relay 277 closing contacts 277a through 277k and paralleling all normally open contacts of sequence timer cams 106g through 106r. During the interval when these cam switches are opening again this prevents momentary interruption of the audio tones. As these cam switches release transferring the connection of the zone control lines from the output of amplifier 262 to the output of amplifier 263. Sequence timer cam 106f closes from 356° to 6° this operates watering timer 278 through bank E of stepping switch 120, bank D of stepping switch 119 energizes indicator lamps 279 through 303 indicating which sprinkler is operating. Bank D of stepping switch 120 selects the proper timing control 304 through 328 permitting individual adjustment of the operating time of that sprinkler. Sequence timer 106 will stop at 360° when sequence timer cam 106a opens. Upon completion of the timing interval contacts on the timer 278a will close bridging the open contacts of sequence timer cam 106a and starting sequence timer 106. At 6° of revolution sequence timer cam 106f will open releasing and resetting watering timer 278. The previously described sequence will repeat. Stepping switch 119 will move to the next selected sprinkler position determined by the grounding of the stepper bank terminals on 119A as selected by the programming switches 129 through 253. In sequence, the sequence timer cams 106g through 106r will transfer the control lines to a new pair of audio tones causing the operation of the next desired sprinkler. This sequence will repeat until all sprinklers selected will have been operated. As stepping switch 119 passes through home in searching for ground after operation of the last sprinkler its off normal springs will close causing repeat cycle stepping switch 121 to again step one point. Banks A through E of stepping switch 121 are connected to repeat cycle switches 329 through 333. The wiper arms of these banks are connected to the release coils of latch relays 102 through 105 and 119. When the system has gone through the desired number of watering cycles for a program as determined by the setting of switch 329 through 333 the corresponding latch relay will be released. This will release the associated sunflower relays 124 through 128 removing the ground from programming switches 129 through 253. If more than one program group has been selected the program will continue operating only those sprinkler call for by the latch relays remaining operated. When the last latch relay is released relay 334 will release, removing power from the normal stepping circuit of 119 and 120 and applying power to a homing circuit on 119 formed by 119 off normal, normally open and 119 interrupter springs B. Stepping switch 119 will therefore home. This removes all audio tones from the normally open circuits of cams 106g through 106r and as sequence timer 106 continues to operate it transfers each zone in turn from the operating sprinkler to no sprinkler therefore creating a gradual shut off of all sprinklers. The release of relay 334 has removed the normal source of power to operate stepping switch 120. However the release of the latch relays forms a circuit through 120b through 105b, 119b and 120b normally closed and through normally open off normal springs of 120 to the sequence timer cam 106c therefore after all sprinklers have shut off stepping switch 120 will self pulse until its off normal springs open holding the stepping switch at the home position. The normally closed contacts of the off normal springs of 120 now connect through the normally open off normal springs and normally closed interrupter springs of stepping switch 121 to cause this stepping switch to home. Sequence timer cam 106s closes from 330° to 345°. It applies DC power through a second pair of normally closed off normal springs on 121 to release coil of relay 19. The normally closed contacts 19b of this relay now bridge the contacts of sequence timer cam 18b restarting the sequence timer 18. Sequence timer 18 continues to operate until it reaches 360° at which point sequence timer cam 18a opens stopping the sequence timer and ending the operating sequence of the equipment.

The daily program start switch 336 is connected across the contacts of the starting clock 20a in series with normally closed contacts of 21. Operation of this push button switch will therefore start the automatic sequence called for at any desired time bypassing the operation of the starting clock.

Operation of a manual program is started by momentary closure of manual start switch 337. This locks up latch relay 119 and operates sunflower relay 128 applying grounds to the points in the stepping switch banks 119A and 120A corresponding to the desired sprinklers in the manual program to be operated. Contacts 119E of the latch relay close energizing relay 50 through contacts of sequence timer cam 18h. Normally open contacts 50a close starting sequence timer 18. Normally closed contacts 50b open preventing operation of the daily program stepping switch 16. Since this stepping switch does not operate, no automatic program latching relay will be energized and the automatic programming circuit will be uneffected. The balance of the operation of sequence timer 18 will continue as described above causing sequence timer 106 to start. All sprinklers which are called for in the manual sequence as selected by switches 229 through 253 will operate for as many repeat cycles as called for by selector switch 333 and then shut down as described in the previous sequence. Sequence timer cam 18h of sequence timer 18 is closed from 0° to 16°. Therefore the auxiliary start relay 50 is released after the first 16° of operation of sequence timer 18.

If pause timer switch is operated it apples a ground to the last step of stepper banks 119A and 120A. This causes the stepping switches 119 and 120 to stop at the home position after completion of the first watering cycle in the manual program. Therefore at the completion of the first cycle the sequence timer cams 106g through 106r will gradually shut off all sprinklers rather than transfer to the first sprinklers to be operated in the repeat cycle. Stepping switch bank 120E connects the pause timer 338 in the circuit in place of the watering timer 278 and stepping switch bank 119D energizes the pause timer indicator light 339. The system will therefore operate no sprinklers until the timing out of pause timer 338. Contacts 338A will then close restarting sequence timer 106 starting the next cycle of watering. In all other respects the manual program operates in the same manner as previously described.

Momentary operation of dew wash switch 340 operates the latch coil of relay 120. Normally open contacts 120E close energizing dew wash and greens syringe indicator lamp 341, normally closed contacts 120F open removing the circuit to wiper of stepper bank 120D and normally open contacts 120F close connecting timer control 342. Normally open contacts 120D close operating relay 343. Contacts 343A close bridging the interrupter springs on stepping switch 119, contacts 343B close bridging the interrupter springs of stepping switch 120, contacts 343C close operating auxiliary start relay 50. The operation then proceeds as described under manual operation except that stepping switches 119 and 120 will make one step at a time energizing every sprinkler in turn. The timing interval will be determined by the timing control 342 instead of the timer controls 304 through 328. Upon reaching the last step stepping switch 120 bank H operates the release coil of 120. This initiates the shut down sequence phasing out all operating sprinklers, then releasing 19 stopping sequence timers 106 and 18 in their normal position.

Momentary operation of greens syringe start switch 344 energizes latch relay 120 through contacts 344a and 345 through contacts 344b. Normally open contacts 345a close locking up relay 345. This starts an operating sequence in the same way as previously described. However sequence timer cams 18k and 18l close at approximately 190° of operation of sequence timer 18 and remain closed for any desired interval up to 284°. Closure of these contacts in series with the closure of normally open contacts 345b and 345c apply a selected pair of audio tones to the normally closed contacts of sequence timer cams 106g through 106r putting these tones on the control lines of all zones. These tones actuate audible alarms at each remote unit to provide warning to players on the greens that a greens syringing is about to take place. The duration of this signal can be anything from a few seconds to 30 seconds depending on the duration of closure of cams 18k and 18l. The operating sequence then proceeds as described for dew wash, turning on each sprinkler in turn for the time determined by timing control 342. One terminal of stepper bank 120G is connected to 120 release coil, this connection is made at one step beyond the number of sprinklers that are used for greens. Therefore, upon completion of one cycle on each of the sprinklers in the greens area the wiper of stepper bank 120G which is connected to the coil of relay 345 will energize 120 release causing the sprinkler to phase out and shutting down the system.

If dual day switch 346 is closed then automatic operation started by starting clock 20 proceeds s previously described with the following additions. Sequence timer cam 18f closes from 16° to 18° of revolution of sequence timer 18 latching dual day relay 347. This latch coil is operated by 115 volts AC and obtains its power through contacts 20a of the starting clock and relay 21a. Operation then proceeds as described previously until completion of the automatic program which has been present on daily program switches. Upon shutting down relay 19a closes and since relay 347a contacts are closed sequence timer 18 will not stop but will continue to operate. This will advance stepping switch 16 to the next called for automatic program. Closure of 18a cam of sequence timer 18 operates the release coil of the dual day latch relay 347 between 8° and 10° of revolution of sequence timer 18. Since the starting clock 20 has opened its contacts 20a the latch circuit of 347 will not be operated when 18f closes. Therefore upon completion of the second automatic program the system will shut down. Until the dual day switch 346 is opened the automatic operation will each day operate for the next 2 days programs.

Stop switch 348 is provided to interrupt any program which is in operation. Momentary operation of 348 energizes relay 349 which locks up through normally open contacts 349a and normally closed contacts of sequence timer can 18j. Normally open contacts of 349b close bridging timer contacts 278a and 338a. If either of the timers are operating this will cause sequence timer 106 to restart immediately. Contacts 349c will close and when sequence timer cam 106d operates this will energize sunflower relay 350 sequence timer cam 106d is closed between 330° and 4° of revolution of 106. This prevents operation of 350 during the transferring operations of sequence timer cams 106g through 106r and permits shut down only in a normal phase out sequence. When 350 does operate contacts 350a through 350f, release latch relays 102-105, 119 and 120 and relay 350g releases latch relay 347. This removes all grounds from program selector switches 129 through 253. Sequence timer 106 therefore proceeds to operate in the normal shut down manner phasing out sprinklers in turn as 106g through 106r remove audio tones from the control line and shut down proceeds in the same manner as previously described. As sequence timer 18 moves from the 292° position to home it momentarily opens the contacts of sequence timer cam 18j between 294° and 296°. This releases the locking circuit of stop relay 349 and all circuits are restored to normal. Initiating the stop sequence also opens normally closed contacts 349d. This prevents the latching of any of the automatic program relays 102 through 105 in the event that the stop switch 348 should be operated in the beginning of an automatic cycle. Under these conditions no valves will be energized and the sequence timer 18 and 106 will each complete 1 revolution without operating any. sprinklers.

Emergency stop switch 351 is provided to cause immediate shutdown of any sprinkling which is taking place. Operation of switch 351 energizes relay 352 which locks itself up through its normally open contacts 352a and sequence timer cam 18j. Normally closed contacts 352b open removing AC power from the zone lines 23 through 32 causing all sprinklers to cease operating. Normally open contacts 352c close energizing stop relay 349 and the system goes through the normal stop procedure just previously described. Restoring all circuits to the normal at rest position. Momentary opening of sequence timer cam 18j releases relay 352 as well as relay 349. Connections are provided for emergency shut down should there be a drop in water pressure due to pump failure or to breaking of a line. If a momentary connection is made between the terminals of the low pressure shut down circuit relay 352 will be energized initiating the emergency stop sequence as just described. If contact is maintained across the low pressure shut down connections the system remains inoperative.

Provision is made for rapid testing of the operation of remote control units as follows: Plugging the unit into the test receptacle connects the power line input terminals of the remote to the 115 volt supply and the control line connection to the normally open side of the tone bus connected to cams 106s through 106r. The 25 output circuits which would normally be connected to the sprinkler valves are connected to indicator lamps 354 through 378. Operating any of the manual switches on the remote unit will light the corresponding lights and provide an immediate check that the switch circuits are normal. The balance of the testing is performed as follows: Momentary operation of prepare for test switch 379 initiates the operation. Switch 379a operates manual start relay 50 eliminating operation of the stepping switch 16 and otherwise preparing circuits for normal operation. Switch 379b energizes the latch circuit of test relay 105. Contacts 105a close preparing the circuit to energize 19. Normally closed contacts 105b open removing all 115 volt power from the zone lines. Normally closed contacts 105c open removing the power connection to sequence timer 106 and closing of 105c normally open contacts prepares the circuit to relay 122. When sequence timer 18 operates cam 181 instead of starting sequence timer 106 it will energize relay 122 and ready for test indicator lamp 380. Contacts 122a close locking up relay 122 through switch 381a, normally closed. Normally closed contact 122b opens removing the coil of stepping switch 119 from its normal circuit and closure of 122b normally open connects it to the contacts of sequence timer 382. Depressing start test switch 383 applies power to 384. Closure of the normally open contacts 384b applies power to sequence timer 382. As long as sequence timer 382 is operating its contacts 382a will be closed approximately 2 seconds and open approximately 2 seconds and continue to repeat this sequence. This will cause stepping switch 119 to step on every closure and release of 382a. Contacts 1 through 25 of stepper switch bank 119E are bridged and connected to the normally open contact 384a to the coil of 384. Relay 384 will then lock up through this bank and test start switch 383 can now be released. The various pairs of audio tones associated with each of the 25 steps will now appear on the control line of the test receptable. As long as no faults exist in the remote unit under test the indicator lights 354 through 378 will light in sequence. When stepping switch 119 reaches its home position relay 384 will be de-energized, stopping the sequence timer 382. Additional units can be tested merely by plugging them into the test receptacle and depressing the test start button 383. Upon completion of all desired testing the stop test switch 381 is depressed. Normally closed contacts 381a will open releasing relay 122 and normally open contacts 381b will apply power to release test latch relay 105 and release coil 19r. This causes timer 18 to again start and complete its normal stopping sequence, restoring circuits for normal operation.

Each of the zone lines goes to a satellite unit 500 which has a series of sprinkler valves, not shown, operated by solenoids or motors (not shown). The solenoids or motors are operated by current from lines 550 to 574 inclusive which receive their energy from the zone lines through single pole double throw switches 550a through 574a which have an automatic and a manual position. Each line is controlled by decoders 575 and 576 which operate relays 577 through 588 inclusive which in turn control switches 577a through 588a; 582a; 584a; 586a; 588a; 578b through 587b; 579c through 581c; 583c; 585c; 587c; 580d; 581d; 583d; 585d; and 587d, inclusive. The zone lines enter the satellite system through a filter system made up of condensers 589 and 590 and impedances 591 and 592 which isolate the decoding amplifiers from the 115 or 230 volt, 60 cycle power current.

Briefly stated the operation of the system of this invention as applied to a golf course is as follows. The course is divided into zones 23 through 32 inclusive each consisting of approximately three holes. From a central point at which the master control is located e.g. the clubhouse of a golf course, a two wire power line is buried going to the satellite or slave control 500 associated with each zone. There may be several such satellite controls, e.g. one at each hole, on each zone line. Each satellite or zone control 500 individually controls a plurality of sprinkler valves. All automatic control is exercised by the master control unit or the control may be manual as described above.

Preferably all satellite unit sprinklers are connected to like control numbers in each satellite system. For example, the first five numbers may be on the greens, six through 10 on tees and the balance on the fairways. It is important in golf course watering that the greens sprinklers having the same geographic orientation be assigned the same number. This permits compensation for wind changes and the like. In short, a light north wind can be compensated for by increasing the time on all north sprinklers on the greens and reducing the time on the south sprinklers.

The master control functions as follows. Since good practice calls for watering at set intervals such as every 4 or 5 days, the programming panel of this invention permits setting up four separate programmed groups. Any of the control numbers of the satellite systems may be connected to any or all groups. For example all greens sprinklers may be connected to Group I, tees to Group II and fairways divided between Groups III and IV. The system provides for programming any number of days up to 10 and then automatically repeats the program until changed or shut off. Each day may be programmed to operate any or all groups or none.

It will be understood by men skilled in the art that wherever we have mentioned or illustrated an electro-mechanical relay it will be equally possible to use an equivalent solid state component in lieu thereof.

While a preferred embodiment of this invention has been described in the foregoing specification, it will be obvious that this invention may be otherwise embodied within the scope of the following claims.

We claim:

1. A turf watering control system comprising a master control station and a plurality of spaced slave stations each connected to the master station by a power line, a source of operating electric power applied to said master control station, a plurality of sprinkler valves spaced from each slave station, connections between said valves and each said slave station whereby said valves are selectively opened and closed, an encoder source of radio frequency in said master control station applied to said power lines, decoder means at each of said slave stations, means at said slave stations actuated by said decoder means to energize the connections to said sprinkler valves and means at the master station selectively energizing the encoder means whereby a selected signal is transmitted to selected decoder means through said power lines.

2. A turf watering control system as claimed in claim 1 wherein the master control station includes sequential timing means sequentially connecting the slave stations to the master control station at selected intervals.

3. A turf watering control system as claimed in claim 1 wherein the master control station includes programmer means selectively energizing selected groups of slave stations at different times.

4. A turf watering system as claimed in claim 1 wherein the source of radio frequency is an AM source.

5. A turf watering system as claimed in claim 1 wherein the source of radio frequency is an FM source.

6. A turf watering system as claimed in claim 1 wherein the source of radio frequency is an audio frequency source.

7. A turf watering system as claimed in claim 1 wherein a manual operator switch means is provided to selectively actuate any desired sprinkler valve in the system.

8. A turf watering system as claimed in claim 1 wherein an audible signal is energized prior to energizing the sprinkler valve to open position.

9. A turf watering control system as claimed in claim 1 wherein a pause timer is provided for each slave circuit whereby a selected delay period is introduced between repeat cycles of a given sprinkler.

10. A turf watering control system as claimed in claim 1 wherein the radio frequency is applied directly to the power line connecting the master control and a given slave circuit through high pass filter.

* * * * *

UNITED STATES PATENT OFFICE
CERTIFICATE OF CORRECTION

Patent No. 3,653,595         Dated April 4, 1972

Inventor(s) Julius Edward Greengard, Jr. et al

It is certified that error appears in the above-identified patent and that said Letters Patent are hereby corrected as shown below:

Column 4, line 6, "transformed" should read -- transformer --. Column 5, line 43, cancel "transferring"; line 52, "it" should read -- its --. Column 6, line 33, cancel "and"; line 43, "176A" should read -- 276A --. Column 8, line 1, "apples" should read -- applies --. Column 9, line 13, "can" should read -- cam --; line 41, after "any" delete the period. Column 8, line 72, "present" should read -- preset --.

Signed and sealed this 7th day of November 1972.

(SEAL)
Attest:

EDWARD M. FLETCHER, JR.                ROBERT GOTTSCHALK
Attesting Officer                       Commissioner of Patents